(12) United States Patent
Shi

(10) Patent No.: US 12,096,751 B2
(45) Date of Patent: Sep. 24, 2024

(54) PET PULLING PIECE WITH REPLACEABLE PATTERNED PANEL ON BOTH SIDES

(71) Applicant: JINHUA SOLID TOOLS CO., LTD., Zhejiang (CN)

(72) Inventor: Fuyou Shi, Zhejiang (CN)

(73) Assignee: JINHUA SOLID TOOLS CO., LTD., Jinhua (CN)

( * ) Notice: Subject to any disclaimer, the term of this patent is extended or adjusted under 35 U.S.C. 154(b) by 78 days.

(21) Appl. No.: 17/976,878

(22) Filed: Oct. 31, 2022

(65) Prior Publication Data

US 2023/0301274 A1 Sep. 28, 2023

(30) Foreign Application Priority Data

Mar. 23, 2022 (CN) .......................... 202220639601.7

(51) Int. Cl.
*A01K 27/00* (2006.01)

(52) U.S. Cl.
CPC .................................. *A01K 27/004* (2013.01)

(58) Field of Classification Search
CPC .... A01K 27/004; A01K 27/00; A01K 27/003; A01K 27/008
See application file for complete search history.

(56) References Cited

U.S. PATENT DOCUMENTS

| 6,003,472 | A  | * | 12/1999 | Matt ..................... | F21V 33/008 |
|---|---|---|---|---|---|
|  |  |  |  |  | 119/796 |
| 6,240,881 | B1 | * | 6/2001 | Edwards .............. | A01K 27/006 |
|  |  |  |  |  | 119/795 |
| 6,792,893 | B1 | * | 9/2004 | Quintero ............. | A01K 27/004 |
|  |  |  |  |  | 119/796 |
| 2008/0136099 | A1 | * | 6/2008 | Frost ........................ | A63F 9/10 |
|  |  |  |  |  | 273/157 R |
| 2012/0205479 | A1 | * | 8/2012 | Wang ................... | A01K 27/004 |
|  |  |  |  |  | 242/396.4 |
| 2014/0238314 | A1 | * | 8/2014 | O'Brien ............... | A01K 27/004 |
|  |  |  |  |  | 119/796 |
| 2016/0345541 | A1 | * | 12/2016 | Lai ......................... | A01K 29/00 |
| 2017/0297857 | A1 | * | 10/2017 | Shi ..................... | B65H 75/4431 |
| 2018/0303069 | A1 | * | 10/2018 | Cox ..................... | A01K 27/004 |
| 2018/0338474 | A1 | * | 11/2018 | Bogdahn ............. | B65H 75/4431 |

* cited by examiner

*Primary Examiner* — Monica L Perry
*Assistant Examiner* — Spencer T Callaway

(57) ABSTRACT

Disclosed is a pet pulling piece with replaceable panel on both sides comprising a shell, a string roller provided inside the shell, and a pulling belt with one end being mounted on an inner side of the string roller and with the other end extending through a wire outlet to an outside of the shell. The shell is provided with a switch key being unlockable and lockable, the string roller is capable of being locked or unlocked by the switch key, a replaceable panel is provided on a left side and a right side of the shell respectively; a detachable garbage bag can be provided on a bottom of the shell, garbage bags are arranged in the garbage bag can, and the garbage bag can is provided with a hanging position for hanging the garbage bag.

7 Claims, 5 Drawing Sheets

PET PULLING PIECE WITH REPLACEABLE PATTERNED PANEL ON BOTH SIDES

CROSS REFERENCE OF RELATED APPLICATIONS

The present application claims priority of Chinese Utility Model Application No. 202220639601.7, filed on Mar. 23, 2022, the entire contents of which are hereby incorporated by reference.

TECHNICAL FIELD

The disclosure relates to a pet pulling piece, and in particular to a pet pulling piece with replaceable patterned panel on both sides.

BACKGROUND

Pet pulling piece generally includes a pet pulling piece mainframe and a pulling rope, the pulling rope is connected to a string roller in the pet pulling piece mainframe. Generally, in order to obtain a desired length of release, a locking structure will be provided, and the locking structure stops the string roller from releasing a pulling rope, so that the pulling rope is kept at a fixed length.

The current pet pulling piece has the following shortcomings that:
1. The pulling pieces now available on the market do not have a replaceable puzzle panel, which is lack of interest.
2. The pulling pieces now available on the market do not have the function of carrying pet feces, resulting in a monotonous function.
3. The pulling pieces now available on the market have a complex switch structure being inconvenient to operate.
4. The pulling pieces now available on the market is not easy to assemble.

SUMMARY

The technical problem to be solved by the disclosure is a pet pulling piece with replaceable patterned panel on both sides, replaceable patterned panels are disposed on left side and right side, such that the fun and interactivity increase, and the garbage bag can may have the function of carrying pet excrement bags. In addition, a component set for switch can be assembled together first, which is easy to assemble, and a switch structure is cleverly designed and has a comfortable handfeel.

The disclosure is achieved by the following technical solution: a pet pulling piece with replaceable patterned panel on both sides including a shell, a string roller provided inside the shell, and a pulling belt with one end being mounted on an inner side of the string roller and with the other end extending through a wire outlet to an outside of the shell, wherein the shell is provided with a switch key being unlockable and lockable, the string roller is capable of being locked or unlocked through the switch key, each of a left side and a right side of the shell (1) is provided with a replaceable panel (12); a detachable garbage bag can is provided on a bottom of the shell, garbage bags are arranged in the garbage bag can, and the garbage bag can is provided with a hanging position for hanging the garbage bag.

As a preferred technical solution, the switch key being unlockable and lockable includes a large switch, a small switch, a locking block and a pin, the locking block is fitted into a locking block slot inside the large switch through a snap structure, the small switch is assembled on the locking block by the pin, the large switch has a component groove and the small switch is partially mounted into the component groove.

As a preferred technical solution, a spring mounting cavity is formed in the middle of the locking block and penetrates the locking block in a front-rear direction, a support plate is provided on the shell and arranged under the spring mounting cavity, the support plate passes through the spring mounting cavity, a spring is located in the mounting cavity, one end of the spring abuts against the support plate, and the other end of the spring abuts against the locking block, an end of the locking block is provided with a protruding locking tab, a plurality of protruding stop portions are provided on both sides of an edge of the string roller, the spring is pressed when the large switch is pressed down, at which time the locking tab at the end of the locking block is stuck to the protruding stop portion on the edge of the string roller to lock the string roller.

As a preferred technical solution, a snap is provided on a top of the small switch, a limiting convex part is provided in an upper end of the shell, a snap recess is provided on a part of the shell facing to a side of the limiting convex part, when the small switch is pushed relative to the large switch for locking, the snap is elastically deformed and snapped into the snap recess through the limiting convex part.

As a preferred technical solution, the replaceable panel is provided with a trademark or a pattern.

As a preferred technical solution, the replaceable panel is a puzzle panel, an upper end of the puzzle panel is provided with a puzzle building area, a puzzle pattern is allowed to be built through the puzzle panel.

As a preferred technical solution, the pulling belt is a webbing, a part of the pulling belt extending out of the shell is provided with a hook part and a plat belt sheath, a grip part of the shell is coated with rubber.

The beneficial effect of the present disclosure is that: the disclosure has replaceable patterned panels disposed on left side and right side, such that the fun and interactivity increase, and the garbage bag can may have the function of carrying pet excrement bags. In addition, a component set for switch can be assembled together first, which is easy to assemble, a switch structure is cleverly designed and has a comfortable handfeel, and the overall structure design is more reasonable.

BRIEF DESCRIPTION OF THE DRAWINGS

To more clearly describe the technical solutions in the embodiments of the present disclosure or in the prior art, the accompanying drawings required for describing the embodiments or the prior art are briefly introduced below. Apparently, the accompanying drawings in the following description merely show some embodiments of the present disclosure, and a person of ordinary skill in the art may still derive other drawings from these accompanying drawings without creative efforts.

DESCRIPTION OF THE EMBODIMENTS

All features disclosed in the specification, or the steps of all methods or processes disclosed, may be combined in any manner other than mutually exclusive features and/or steps.

Any feature disclosed in this specification (including any accompanying claims, abstract, and drawings) may, unless specifically stated, be replaced by other equivalent or similar alternative features serving the same purpose. That is, unless specifically stated, each feature is only one example of a generic series of equivalent or similar features.

In the description of the disclosure, it need to be understood is that the terms "end", "the other end", "outside", "up", "inside", "level", "coaxial", "center", "end part", "length", and "outer end" indicate location or position relationship based on the location or position relationships shown in the accompanying drawings, only to facilitate the description of this disclosure and simplify the description, other than indicate or imply that those indicated devices or components must have a particular orientation or must be constructed and operated in a particular orientation. Therefore, it cannot be understood as a limitation of the disclosure.

Furthermore, in the description of the disclosure, "a plurality of" means at least two, e.g., two, three, etc., unless specifically indicated otherwise.

Terms used in the present disclosure to represent relative positions in space, such as "upper", "above", "below", "lower" and the like are used for ease of description to describe one element or feature's relationship to another element(s) or feature(s) as illustrated in the figures. The spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the term "under" can encompass both an orientation of over and under. The device may be oriented in other ways (rotated 90 degrees or at other orientations) and the spatially relative descriptors used in this specification are interpreted accordingly.

In the present disclosure, otherwise expressly specified and qualified, the terms "provided", "muff-coupling", "connect", "pass through", "plug", etc. shall be understood broadly, for example, may be understood as fixed connection, detachable connection, or integrated; mechanical connection or electrical connection; direct connection or indirect connection through an intermediary, and communication or interconnections between two elements, unless otherwise expressly qualified. The person of ordinary skill in the art may understand the specific meanings of the above terms in the present disclosure according to the specific circumstances.

Figure 1:
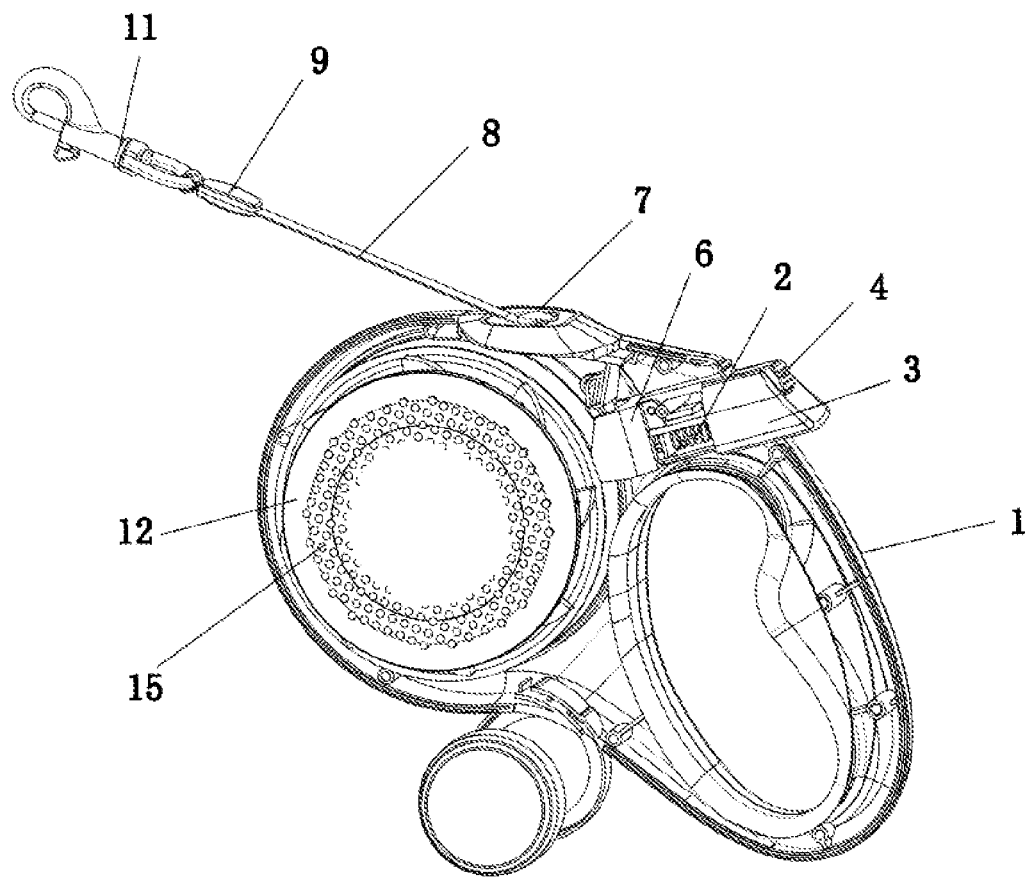
FIG. 1 is a schematic view of the present disclosure in an unlocked state.
Figure 6:
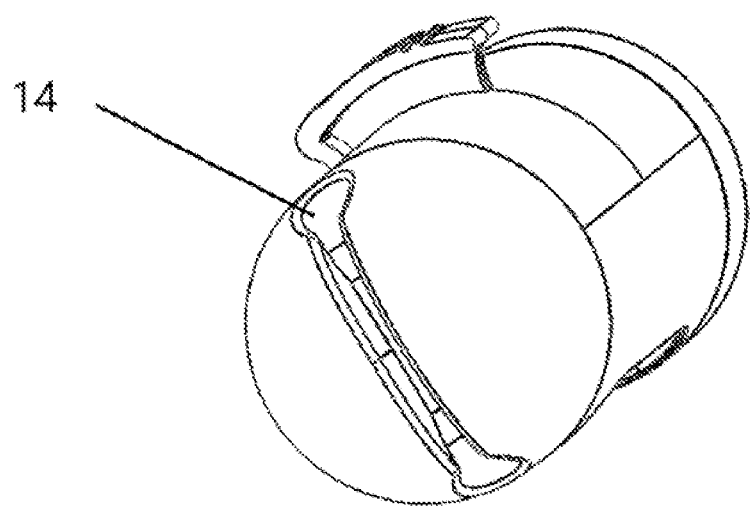
FIG. 6 is structural schematic view of the garbage bag can.

As shown in FIG. 1, a pet pulling piece with replaceable patterned panel on both sides of the present disclosure includes a shell 1, a string roller provided inside the shell 1, and a pulling belt 8 with one end being mounted on an inner side of the string roller and with the other end extending through a wire outlet 7 to an outside of the shell 1. The shell 1 is provided with a switch key being unlockable and lockable, the string roller is capable of being locked or unlocked through the switch key. Each of a left side and a right side of the shell 1 is provided with a replaceable panel 12. A detachable garbage bag can is provided on a bottom of the shell 1, garbage bags are arranged in the garbage bag can, and the garbage bag can is provided with a hanging position 14 for hanging the garbage bag, as shown in FIG. 6.

Figure 4:
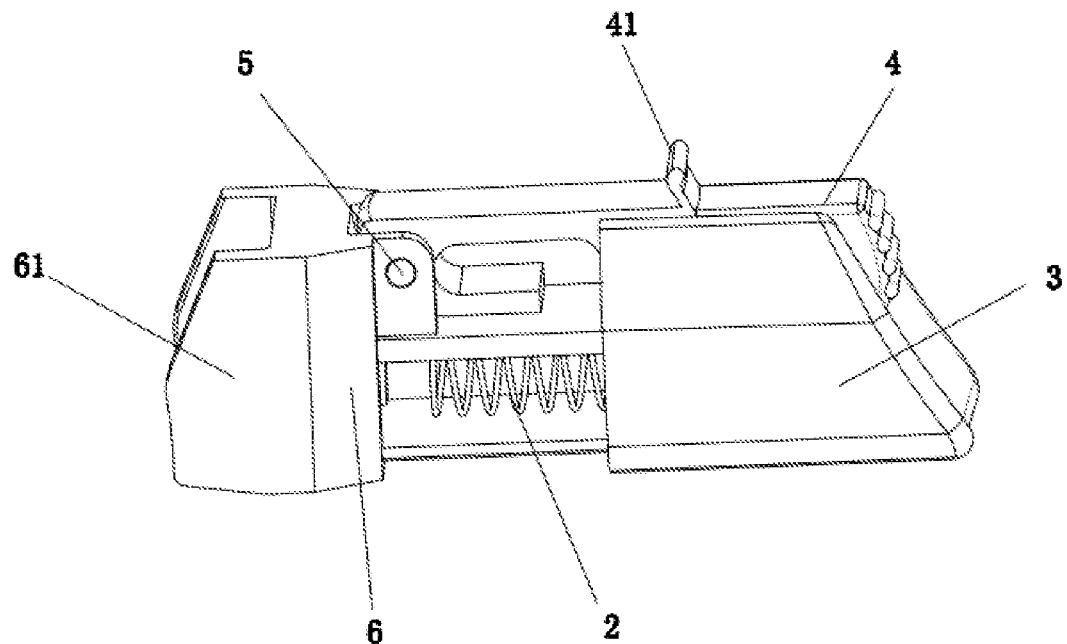
FIG. 4 a structural schematic view of the switch key of the present disclosure.
Figure 5:
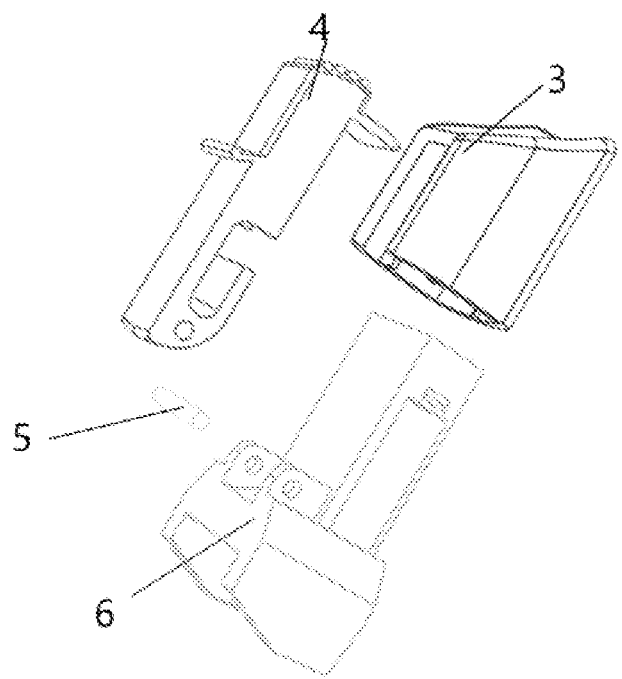
FIG. 5 shows the exploded schematic view of the switch key of the present disclosure.

As shown in FIG. 4 and FIG. 5, the switch key being unlockable and lockable includes a large switch 3, a small switch 4, a locking block 6 and a pin 5. The locking block 6 is fitted into a locking block slot inside the large switch 3 through a snap structure, the small switch 4 is assembled on the locking block 6 by the pin 5, the large switch 3 has a component groove, and the small switch is partially mounted into the component groove.

Figure 3:
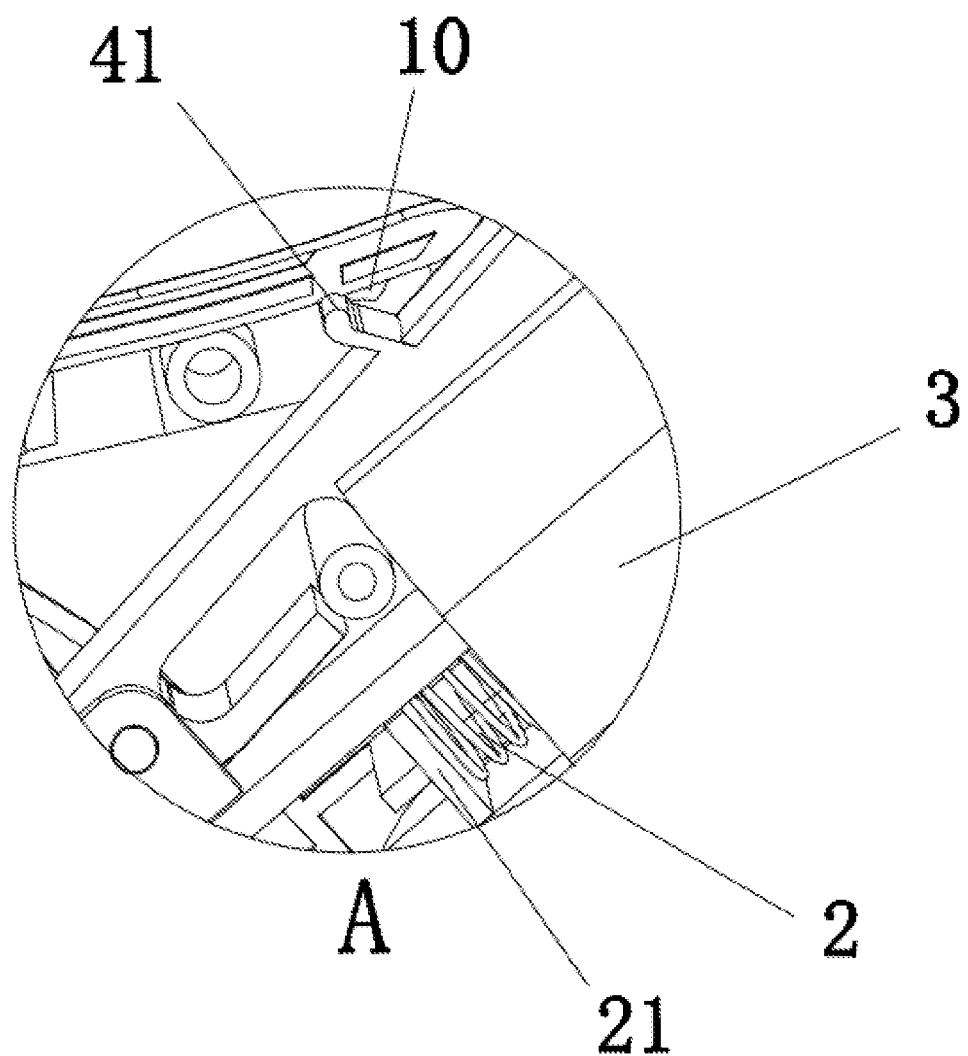
FIG. 3 a partial enlarged view of part A in FIG. 2 of the present disclosure.

As shown in FIG. 3, a spring mounting cavity is formed in the middle of the locking block 6 and penetrates the locking block 6 in a front-rear direction, a support plate 21 is provided on the shell and arranged under the spring mounting cavity, the support plate 21 passes through the spring mounting cavity, a spring 2 is located in the mounting cavity, one end of the spring 2 abuts against the support plate 21, and the other end of the spring 2 abuts against the locking block 6, an end of the locking block 6 is provided with a protruding locking tab 61, a plurality of protruding stop portions are provided on both sides of an edge of the string roller, the spring is pressed when the large switch 3 is pressed down, at which time the locking tab 61 at the end of the locking block 6 is stuck to the protruding stop portion on the edge of the string roller to lock the string roller.

For a locking operation of the switch key, the big switch is pressed and the small switch is pushed forward. An initial state is an unlocked state shown in FIG. 1. When the big switch is pressed down by a thumb, and the whole switch key moves in a direction along which the spring is compressed, until the locking block abuts against the protruding stop portion disposed on the string roller, thereby preventing the string roller from moving, and the small switch is pushed forward, and rotates around the pin made of metal to a position shown in FIG. 2. In this case, a buckle disposed at a front end of the small switch abuts against a corresponding position in the shell, to prevent the spring from rebounding, so as to achieve the purpose of locking. An automatically release may be finished by shifting the small switch backward.

In a locked state, when the small switch is shifted backward, the buckle of the small switch no longer abuts against the corresponding position in the shell, under the action of a spring force, the locking switch key moves along the advancing direction of the spring until the locking block leaves the string roller, the string roller can continue to rotate.

As shown in FIG. 3, a snap 41 is provided on a top of the small switch 4, a limiting convex part 10 is provided in an upper end of the shell 1, a snap recess is provided on a part of the shell 1 facing to a side of the limiting convex part 10, when the small switch is pushed relative to the large switch for locking, the snap is elastically deformed and snapped into the snap recess through the limiting convex part 10.

Figure 2:
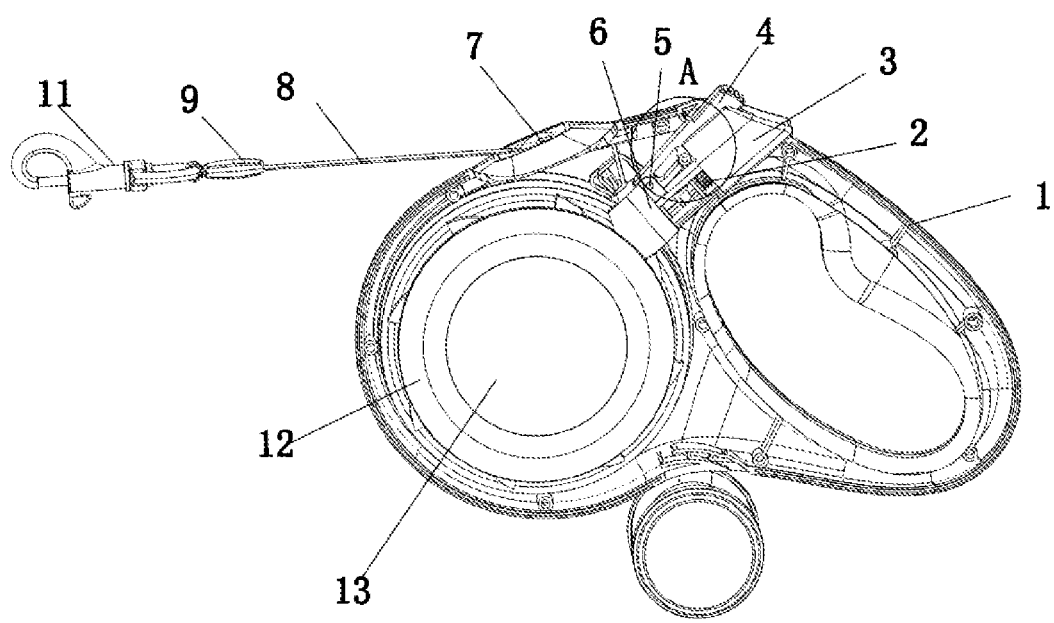
FIG. 2 is a structural schematic view of the present disclosure in a lock state.

In this embodiment, as shown in FIG. 2, the replaceable panel 12 is provided with a trademark or a pattern 13.

As shown in FIG. 1, the replaceable panel 12 is a puzzle panel, an upper end of the puzzle panel is provided with a puzzle building area 15, a puzzle pattern is allowed to be built through the puzzle panel.

The pulling belt 8 is a webbing, a part of the pulling belt 8 extending out of the shell is provided with a hook part 11 and a plat belt sheath 9, a grip part of the shell 1 is coated with rubber.

The above is only a specific implementation of the disclosure, however, the protection scope of the disclosure is not limited, and any change or replacement thought without creative labor shall be covered within the protection scope of the disclosure. Therefore, the protection scope of the disclosure shall be subject to the protection scope defined in the claims.

What is claimed is:

1. A pet pulling piece with replaceable patterned panel on both sides comprising:
    a shell (1);
    a string roller provided inside the shell (1); and
    a pulling belt (8) with one end being mounted on an inner side of the string roller and with an other end extending through a wire outlet (7) to an outside of the shell (1),
    wherein the shell (1) is provided with a switch key being unlockable and lockable, the string roller is capable of being locked or unlocked by the switch key, each of a left side and a right side of the shell (1) is provided with a replaceable panel (12);
    wherein the switch key comprises:
        a large switch (3);
        a small switch (4);
        a locking block (6); and
        a pin (5),
    wherein the locking block (6) is partially fitted into a locking block slot inside the large switch (3) through a snap structure, the locking block (6) and the large switch (3) are separately formed, the large switch (3) has a component groove, the component groove and the locking block slot are disposed front and back, the small switch (4) is partially mounted into the component groove, a portion of the small switch (4) protruding out from the component groove is assembled by the pin (5) on a portion of the locking block (6) protruding out from the locking block slot, and the small switch (4) is rotatable back and forth around the pin (5), and
    wherein the small switch (4) has a protrusion that extends towards the large switch (3) and into the locking block slot.

2. The pet pulling piece with replaceable patterned panel on both sides according to claim 1, wherein a spring mounting cavity is formed in the middle of the locking block (6) and penetrates the locking block (6) in a front-rear direction, a support plate (21) is provided on the shell and arranged under the spring mounting cavity, the support plate (21) passes through the spring mounting cavity, a spring (2) is located in the mounting cavity, one end of the spring (2) abuts against the support plate (21), and an other end of the spring (2) abuts against the locking block (6), an end of the locking block (6) is provided with a protruding locking tab (61), a plurality of protruding stop portions are provided on both sides of an edge of the string roller, the spring is pressed when the large switch (3) is pressed down, at which time the locking tab (61) at the end of the locking block (6) is stuck to the protruding stop portion on the edge of the string roller to lock the string roller.

3. The pet pulling piece with replaceable patterned panel on both sides according to claim 1, wherein a snap (41) is provided on a top of the small switch (4), a limiting convex part (10) is provided in an upper end of the shell (1), a snap recess is provided on a part of the shell (1) facing to a side of the limiting convex part (10), when the small switch is pushed relative to the large switch for locking, the snap is elastically deformed and snapped into the snap recess through the limiting convex part (10).

4. The pet pulling piece with replaceable patterned panel on both sides according to claim 1, wherein the replaceable panel (12) is provided with a trademark or a pattern (13).

5. The pet pulling piece with replaceable patterned panel on both sides according to claim 1, wherein the replaceable panel (12) is a puzzle panel, an upper end of the puzzle panel is provided with a puzzle building area (15), a puzzle pattern is allowed to be built through the puzzle panel.

6. The pet pulling piece with replaceable patterned panel on both sides according to claim 1, wherein the pulling belt (8) is a webbing, a part of the pulling belt (8) extending out of the shell is provided with a hook part (11) and a plat belt sheath (9), a grip part of the shell (1) is coated with rubber.

7. The pet pulling piece with replaceable patterned panel on both sides according to claim 1, wherein a detachable garbage bag can is provided on a bottom of the shell (1), garbage bags are arranged in the garbage bag can, and the garbage bag can is provided with a hanging position (14) for hanging the garbage bag.

\* \* \* \* \*